US006307558B1

(12) United States Patent
Mao

(10) Patent No.: US 6,307,558 B1
(45) Date of Patent: Oct. 23, 2001

(54) METHOD OF HIERARCHICAL STATIC SCENE SIMPLIFICATION

(75) Inventor: Crusoe Mao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/262,171

(22) Filed: Mar. 3, 1999

(51) Int. Cl.$^7$ .................................................. G06T 17/00
(52) U.S. Cl. ........................................... 345/428; 345/423
(58) Field of Search ..................................... 345/419, 420, 345/421, 423, 428

(56) References Cited

U.S. PATENT DOCUMENTS

| | | | | |
|---|---|---|---|---|
| 5,317,689 | * | 5/1994 | Nack et al. ........................... | 395/163 |
| 5,990,910 | * | 11/1999 | Laksono et al. ..................... | 345/503 |
| 6,111,582 | * | 8/2000 | Jenkins ................................ | 345/421 |
| 6,137,492 | * | 10/2000 | Hoppe ................................. | 345/420 |
| 6,195,105 | * | 2/2001 | Dilliplane et al. ................... | 345/506 |

OTHER PUBLICATIONS

Foley et al. "Computer Graphics; Principles and Practice" second edition ISBN 0–201–12110–7, reprinted 11/192 and 193, pp. 873–882, Nov. 1992.*

Bishop et al., "Designing a PC Game Engine," IEEE Computer Graphics and Application, Jan./Feb. 1998, pp. 46–53.

Hoppe et al., "Surface Reconstruction from Unorganized Points," University of Washington White Paper, 8 pages.

Belblidia et al., "Generating Various Levels of Detail of Architectural Objects for Image–Quality and Frame–Rate Control Rendering," White Paper, 6 pages.

Cohen et al., "Simplification Envelopes," Computer Graphics (SIGGRAPH '95 Proceedings) (1996), 10 pages.

Hoppe, Hugues, "Progressive Meshes," Microsoft Research White Paper, 10 pages.

Hoppe et al., "Mesh Optimization," Computer Graphics (SIGGRAPH '93 Proceedings) (1993), 8 pages.

Luebke, David, "Hierarchical Structures For Dynamic Polygonal Simplification," TR 96–006, Department of Computer Science, University of North Carolina at Chapel Hill, 7 pages.

Krus et al., "Levels of Detail & Polygonal Simplification," Crossroads, The ACM's First Electronic Publication, 15 pages.

Hoppe, Hugues, Efficient Implementation of Progressive Meshes, Technical Report MSR–TR–98–02, Microsoft Research, Jan. 1998, 10 pages.

* cited by examiner

*Primary Examiner*—Mark Zimmerman
*Assistant Examiner*—Enrique L Santiago
(74) *Attorney, Agent, or Firm*—Steven P. Skabrat

(57) ABSTRACT

A method of scene simplification includes concurrently simplifying a plurality of objects in a scene represented by a hierarchical scene graph. The objects are represented as polygonal meshes and the hierarchical scene graph includes a plurality of nodes, each node storing a mesh. The scene is a three dimensional scene and the objects are representations of three dimensional objects. Concurrently simplifying the plurality of objects includes determining an initial least level of detail polygon reduction ratio (LPPR) for at least one mesh, generating levels of detail variables for at least one mesh using the LPPR, and generating a simplified version of at least one mesh by using the levels of detail variables.

14 Claims, 5 Drawing Sheets

METHOD OF HIERARCHICAL STATIC SCENE SIMPLIFICATION

BACKGROUND

1. Field

The present invention relates generally to computer graphics and, more specifically, to polygonal surface simplification of three dimensional objects in a scene.

2. Description

Computer-generated visual simulations are used in many application areas, such as flight simulation, building walkthroughs, computational fluid dynamics, and video games, for example, with the purposes of training, evaluation, education, and entertainment. Since recent general purpose graphics workstations and personal computers (PCs) allow the interactive display of thousands of polygons making up representations of three dimensional (3D) objects, these simulations have become more common and accessible to a variety of users, such as scientists, educators, and game players. However, as graphics performance increases and its cost decreases, a new generation of users will demand even more complex and more realistic animations. Such animations will require real-time performance at approximately constant frame rates so that the user has the feeling of actual immersion in a virtual world.

In response, content authors are creating more complicated simulations. A simulation may include many different scenes, each with many objects. An object is typically represented as a polygonal mesh. A complicated object may be represented by a mesh containing hundreds or thousands of polygons. When more polygons are present in the mesh, the quality of the image shown on the display is better (that is, it is more detailed), but the time required to display the object is higher. When less polygons are present in the mesh, the quality of the image is poorer, but the time required to display the object is lower. In some cases, a graphics subsystem cannot render a scene having many complicated objects in real-time. A graphics subsystem may attempt to simplify some or all of the objects so that the scene can be displayed more quickly. For example, if an object is initially represented by a mesh having 10,000 polygons, it may be simplified by methods known in the art to a representation of the object having only 1,000 polygons. The object may be simplified further, for example, into a representation having only 100 polygons. These different representations are called levels of detail (LOD). Such LODs are commonly represented in a multi-resolution mesh (MRM). Depending on the desired image quality and system bandwidth, different instances of a multi-resolution mesh representing an object may be used.

Various scene management techniques are used by 3D graphics packages to increase the performance of displaying the scene on a display. For example, some objects in a scene may be simplified by utilizing one or more of several known methods. These methods are known as polygonal surface simplification techniques or mesh simplification techniques. In some cases, objects appearing farther away from a user may be simplified into meshes having fewer polygons (and thus be lower quality images) while objects appearing closer to a user may be only slightly simplified or not simplified at all.

A drawback of polygonal surface simplification techniques known to date is that they operate only on individual objects at a time. Hence, these techniques are inefficient and inadequate for handling complex scenes having large numbers of complex objects. Therefore, a technique that automatically simplifies all of the objects in a scene according to predetermined criteria and that balances image quality and system performance would be a significant advance in the computer graphics art.

SUMMARY

An embodiment of the present invention is a method of scene simplification. The method includes concurrently simplifying a plurality of objects in a scene represented by a hierarchical scene graph.

BRIEF DESCRIPTION OF THE DRAWINGS

The features and advantages of the present invention will become apparent from the following detailed description of the present invention in which.

DETAILED DESCRIPTION

An embodiment of the present invention comprises a method of simplifying a hierarchical static scene having multiple 3D objects. Embodiments of the present invention balance the requirements of performance and accuracy for simplification of the 3D objects, and hence, the overall scene. An embodiment of the present invention concurrently and automatically simplifies multiple 3D objects in a 3D scene by balancing the percentage of simplification of the objects with respect to the overall appearance of the scene. An embodiment of the present invention balances the three competing requirements of system performance, resolution of the images, and distance of the objects from a virtual camera or focal point in the scene, to produce an optimal representation of the scene based on predetermined criteria. An embodiment of the present invention computes the complexity of different parts of a 3D object and determines the percentage of the object to simplify. This assists in minimizing changes in the appearance of the object during simplification. Through the use of embodiments of the present invention, artists may easily generate levels of detail (LOD) objects. This may be accomplished after setting one or more operational parameters. In one embodiment, the simplification method may be implemented as a software component "plug-in" which may be independent of a particular scene manager or rendering engine.

Reference in the specification to "one embodiment" or "an embodiment" means that a particular feature, structure, or characteristic described in connection with the embodiment is included in at least one embodiment of the invention. Thus, the appearances of the phrase "in one embodiment" appearing in various places throughout the specification are not necessarily all referring to the same embodiment.

Figure 1:
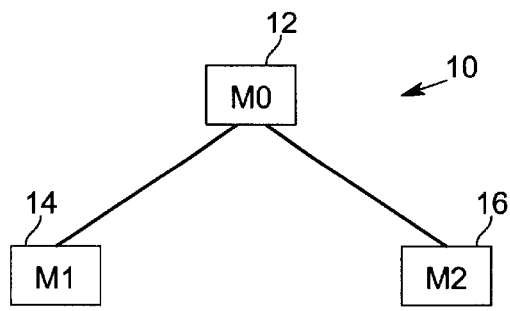
FIG. 1 is a diagram of a sample scene graph having three meshes according to an embodiment of the present invention.

An embodiment of the present invention operates within a 3D graphics application, which creates and manages a scene graph stored in a graphical database. A scene graph is a data structure used to store a scene. A scene graph is typically structured as a tree, or more specifically, a directed acyclic graph (DAG). Nodes of the tree represent individual models of 3D objects present in a scene. The scene graph may comprise multiple complex, highly detailed polygonal surfaces or meshes arranged in a hierarchical manner. FIG. 1 is a diagram of a sample scene graph having three meshes according to an embodiment of the present invention. In this example, scene graph 10 comprises three polygonal meshes: M0 12, M1 14, and M2 16, arranged in a hierarchy as shown. Although this example shows three meshes being part of the scene graph, one skilled in the art will understand that a scene graph may comprise any number of meshes in any number of levels of a hierarchy, and the present invention is not limited in scope in this respect.

Figure 2:
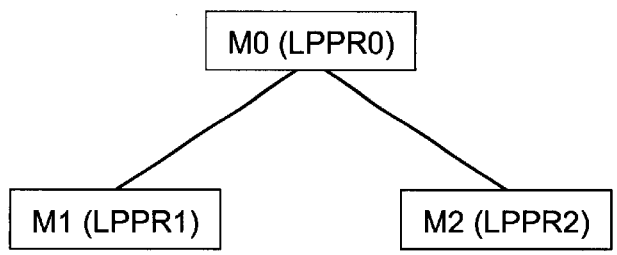
FIG. 2 is a diagram of the sample scene graph of FIG. 1 wherein the meshes have associated least level of detail polygon reduction ratios (LPRRs)
Figure 4:
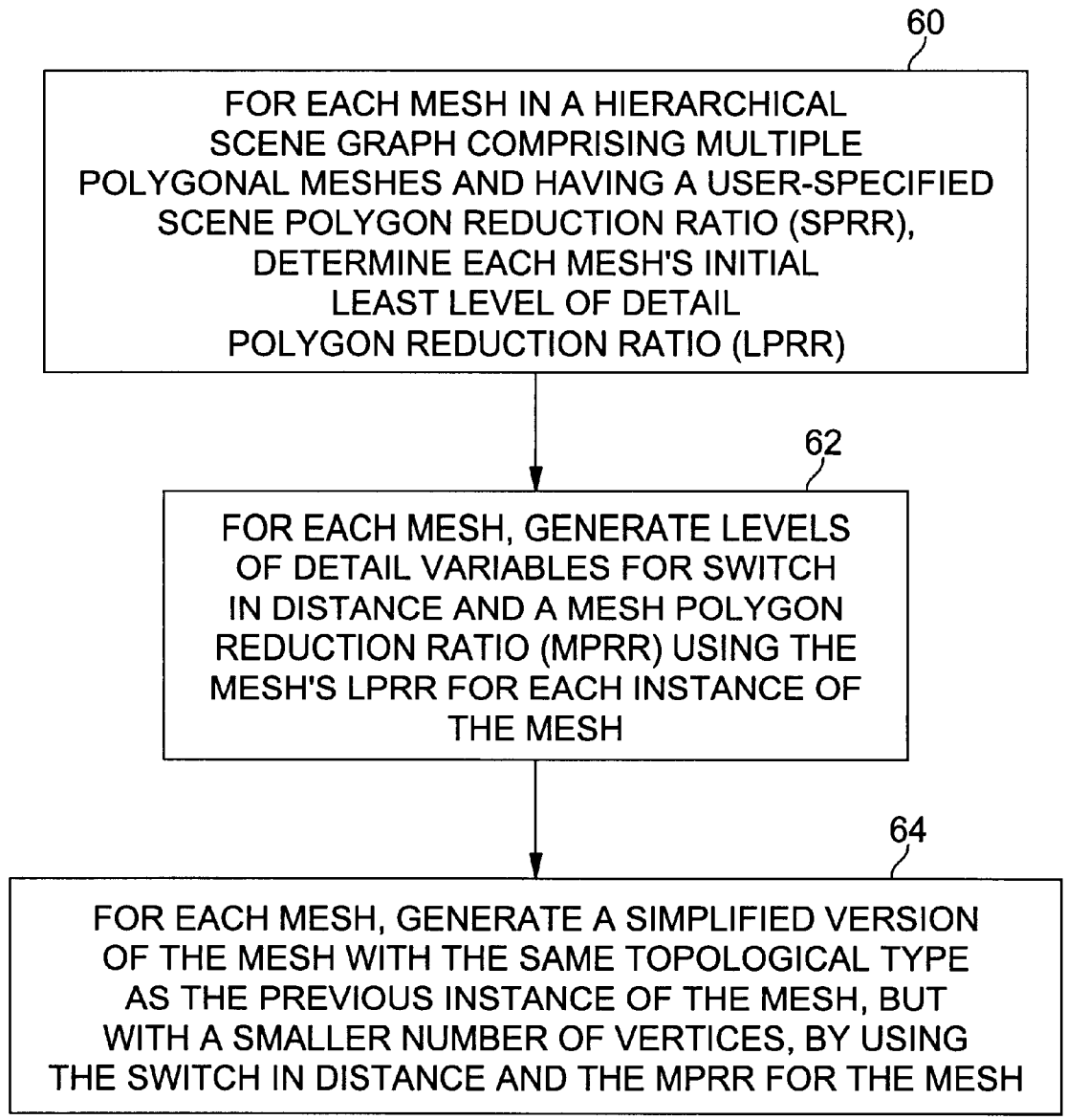
FIG. 4 is a flow diagram of hierarchical static scene simplification according to an embodiment of the present invention.

FIG. 4 is a flow diagram of hierarchical static scene simplification according to an embodiment of the present invention. An embodiment of the present invention concurrently simplifies a plurality of objects in a scene represented by a hierarchical scene graph. This solves the problem of overall scene simplification instead of merely simplifying individual meshes without regard to the impact of such mesh simplifications on the scene as a whole. For a hierarchical scene graph made up of a plurality of polygonal meshes, and using a user-specified scene polygon reduction ratio (SPRR), each mesh's initial least level of detail polygon reduction ratio (LPRR) may be determined at block 60. The SPRR comprises a user-specified or predetermined parameter of how much the overall scene should be simplified. Each mesh of the scene includes a LPRR parameter for specifying how much an individual mesh should be simplified within the context of the scene. Once a mesh's LPRR has been determined, the mesh should be simplified to this ratio. When the LPRR is lower, the mesh may be simplified to a greater degree and fewer polygons are in the resulting mesh. When the LPRR is higher, the mesh may be simplified to a lesser degree and more polygons are in the resulting mesh. FIG. 2 is a diagram of the sample scene graph of FIG. 1 wherein the meshes have associated least level of detail polygon reduction ratios (LPRRs) as determined at block 60.

Figure 3:
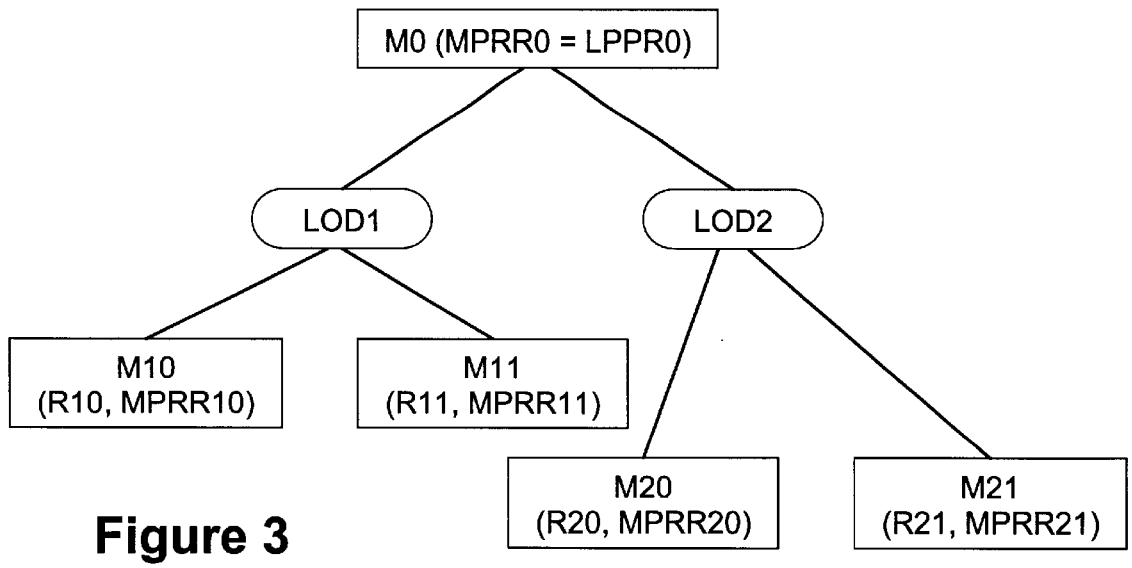
FIG. 3 is a diagram of the sample scene graph of FIG. 1 after generation of levels of detail for each mesh.

Next, for each mesh in the scene, levels of detail (LOD) variables for each instance of the mesh may be generated using the mesh's LPRR at block 62. Each set of LOD variables may used with a discrete level of detail or instance of a mesh. In one embodiment, the LOD variables comprise a "switch in distance" and a mesh polygon reduction ratio (MPRR). A switch in distance provides control of discrete levels of detail based on the distance in 3D space from a virtual camera to an object within the scene. The MPRR is a derived value representing a desired ratio for simplification of a discrete level of detail of a mesh. The result of this generation operation for the sample scene graph is shown in FIG. 3, where R represents a switch in distance and MPRR represents a mesh polygon reduction ratio. Implementation of block 62 solves distance, resolution and performance balancing issues. Given a desired resolution of an object, a simplified version of the object may then be produced according to a selected polygonal surface simplification technique. At block 64, for each mesh, a simplified version of the mesh with the same topological type as the previous instance of the mesh, but with a smaller number of vertices, may be generated by using the prior generated MPRR for the mesh. That is, given an initial polygonal mesh M0 in three dimensions, produce a mesh M, of the same topological type as M0; therefore, M is topologically equal to M0. The three operations shown in FIG. 4 are defined in further detail below.

I. Determining Each Mesh's Initial Least Level of Detail Polygon Reduction Ratio (LPRR)

Block 60 describes an operation of determining each mesh's initial least level of detail polygon reduction ratio (LPRR). A mesh may be simplified initially according to this ratio. A LPRR may be determined for every mesh in a scene. Input parameters to this operation include: (1) a static tree-structured scene graph having n meshes : Mesh (n)= $\{M_1, M_2 \ldots M_n\}$, and (2) a user-specified SPRR for the scene represented by the scene graph. An output parameter of this operation includes each mesh's LPRR: LPRR (n)= $\{LPRR_1, LPRR_2, \ldots LPRR_n\}$.

For example, the scene in FIG. 1 has three meshes: Mesh (3)=$\{M_1, M_2, M_3\}$. A user-specified scene polygon reduction ratio (SPRR) of 10%, for example, may be used. The SPRR may be pre-set for an application or may be entered by a user via a graphical user interface or other input method. If the total number of polygons for Mesh (3)=20,540, then the simplified version of the scene should have a total number of polygons Mesh (3)'<=20,540*10%=2,054. Sample output LPPRs may be, for example, LPRR (3)= $\{70\%, 55\%, 2\%\}$.

Figure 5:
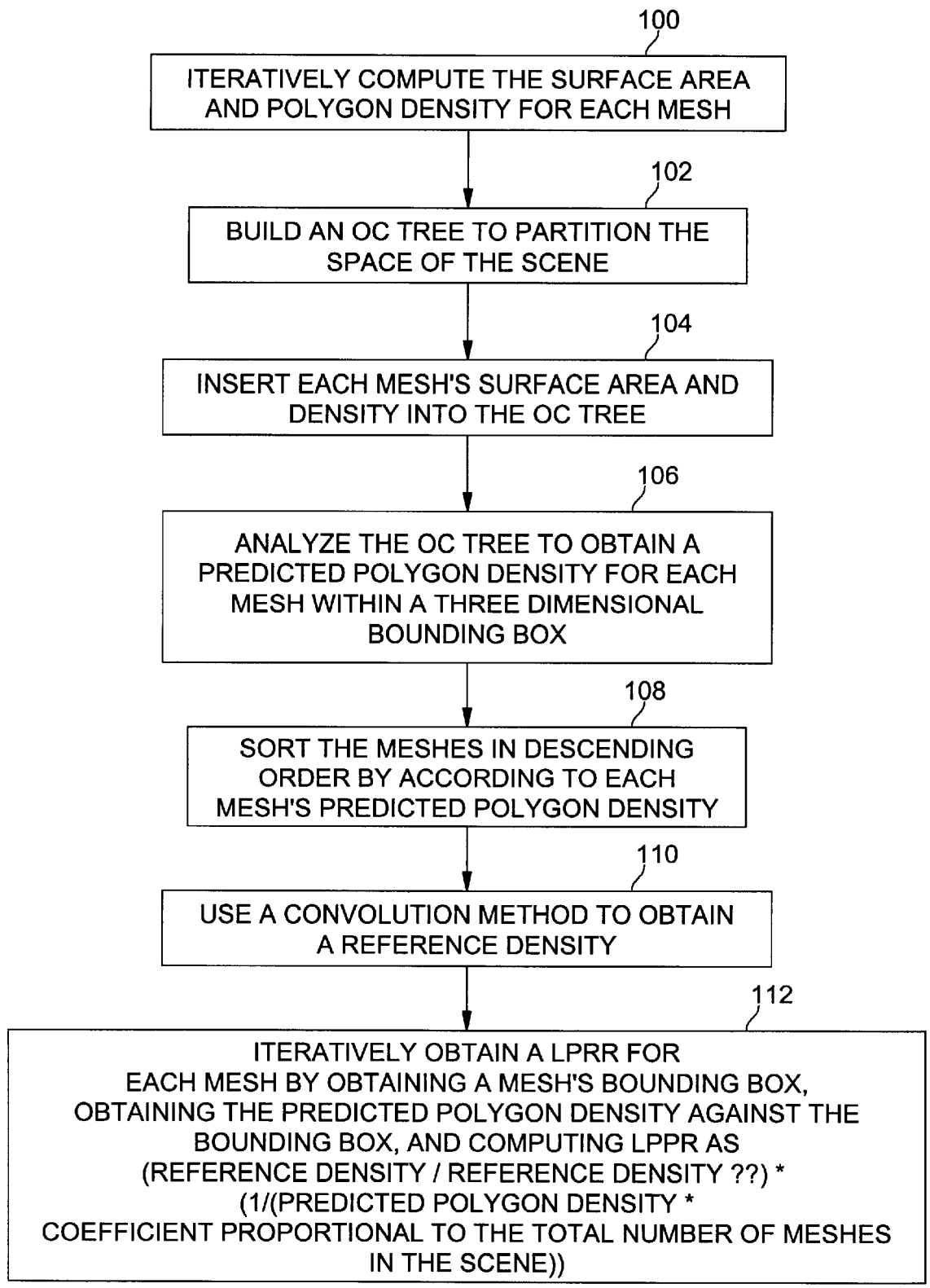
FIG. 5 is a flow diagram of determining a least level of detail polygon reduction ratio (LPRR) for a mesh according to an embodiment of the present invention.

FIG. 5 is a flow diagram of determining a least level of detail polygon reduction ratio (LPRR) for a mesh according to an embodiment of the present invention. The LPRR may be denoted by $\rho$. Given a scene having multiple meshes Mesh (n) and a SPRR, determine the LPRRs. At block 100, the surface area and polygon density for each mesh may be iteratively computed. Polygon density is the total number of polygons of a mesh divided by the surface area of the mesh. At block 102, an octree to partition the 3D space of the scene may be built. An octree comprises a data structure used to represent the volume of the 3D scene. The octree is a tree wherein each node of the tree represents a discrete volume of space in the scene. Each node may have up to eight child nodes. Each node of the octree may be used as a bounding box of an object in the scene. A leaf node stores the surface area and polygon density of a mesh at a volume within the scene. An octree may be used because it can be searched more quickly than other data structures, however, in other embodiments, other data structures may be used.

At block 104, each mesh's surface area and polygon density may be inserted into the octree. At block 106, by analyzing the octree, a predicted polygon density may be determined for a mesh within a given 3D bounding box. This operation may be performed for each mesh in the scene. At block 108, the meshes may be sorted in descending order according to their respective predicted polygon densities. At block 110, a well known signal processing convolution method may be used to find a reference density $\rho$. At block 112, a LPRR may be obtained for each mesh by obtaining the mesh's bounding box, by obtaining the predicted polygon density K against the bounding box B, and by computing LPRR=$(\rho/\rho_i)*(1/(K*C))$, where C is a coefficient proportional to the total number of meshes in scene, and $\rho_i$ is the polygon density or Mesh $M_i$.

I. A. Computing Surface Area and Polygon Density for Each Mesh

In one embodiment of the present invention, the operation of block 100 to compute the surface area and polygon density of each mesh may be implemented as follows. Given M as a polygonal mesh and a point in three dimensional space V=[Vx, Vy, Vz], the axis oriented bounding box for M may be represented by two points: a minimum point Vmin, and a maximum point Vmax. For mesh $M_i$:

Let s represent surface area.

Let $\rho_i$ represent polygon density.

Let p represent a point.

Let $P(M_i)$ represents the total number of polygons.

Then p=Vmax−Vmin;

s=p.x*p.y+p.x*p.z+p.y*p.z; and $\rho_i$=P($M_i$)/s;

I. B. Analyzing the Octree to Obtain a Predicted Polygon Density

Figure 6:
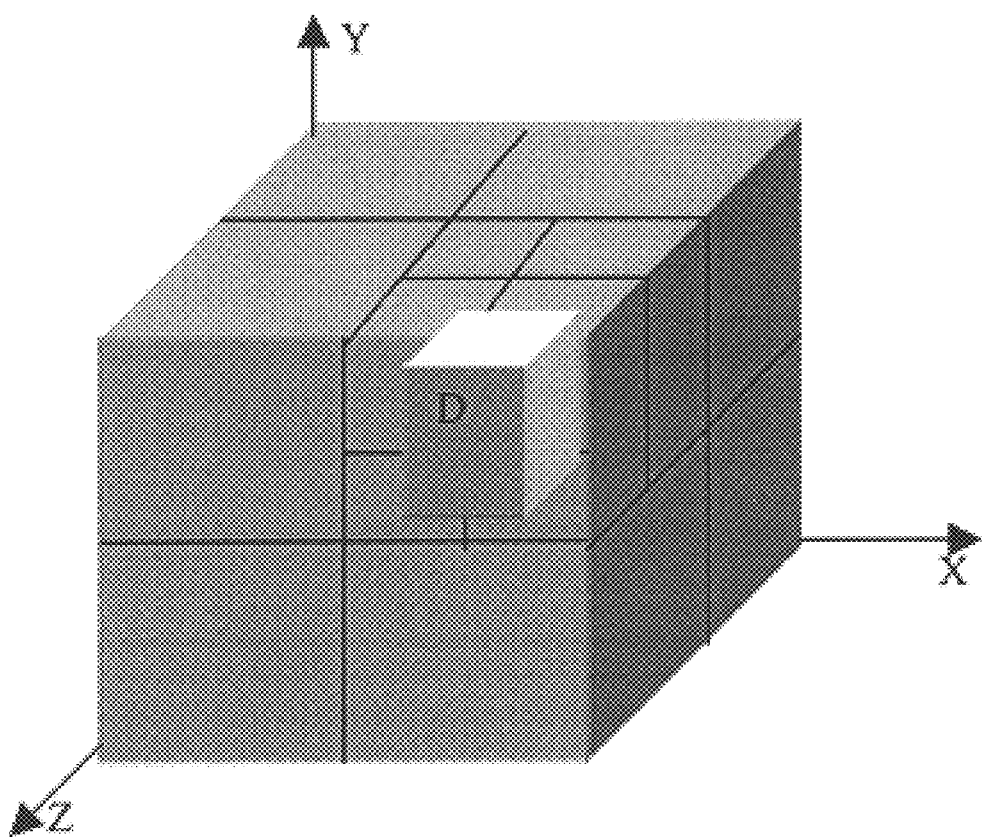
FIG. 6 is a diagram of a sample bounding box intersecting an octree according to an embodiment of the present invention.

One of the advantages of using an octree to partition the space of the scene is to speed up the prediction for the polygon density for any 3D bounding box. FIG. 6 shows that a given bounding box D intersects the octree such that the predicted polygon density of the box D may be determined by a linear interpolation of the densities in those intersected nodes, or more accurately, by using area weighted linear interpolation.

I. C. Obtaining a Reference Polygon Density of a Scene

In one embodiment of the present invention, operation of block 110 may be implemented as follows.

Let $S_i$=the surface area for $M_i$.

Let $\rho_i$=P($M_i$)/$S_i$.

Let S($\rho$): $\rho \rightarrow$ S.

δ(t) is a Dirac swash function.

$$\int_{-\infty}^{+\infty} \delta(\rho - \rho_i) d\rho = 1; \quad (\rho = \rho_i).$$

$$\delta(\rho - \rho_i) = 0; \quad (\rho! = \rho_i).$$

By sampling S($\rho$) with a standard basis Pulse function: u($\rho$).

u($\rho-\rho_i$)=1; if $\rho=\rho_i$.

u($\rho-\rho_i$)=0; if $\rho!=\rho_i$.

Let $R_i$ be the total number of reduced polygons for Mesh(n) at result density $\rho_i$:

$$R_i = \int_{\rho 0}^{\rho}\left(\int_{\rho 0}^{\rho} \delta(\rho - \rho_i) S(\rho) d\rho\right) d\rho = P(Mesh(n)) * SPRR$$

In fact, this integral expression is a convolution. Therefore, the reference density $\rho$, may be obtained by well known methods.

I. D. Obtaining the LPRR

In one embodiment of the present invention, block 112 may be implemented as follows. As long as the bounding box for mesh $M_i$ has been determined, by analyzing the octree, the polygon density K for any 3D box may be predicted. Therefore, K would be a constraint combined with the coefficient C (proportional to the total number of meshes in scene). Thus:

$LPRR_i$=($\rho/\rho_i$)*(1/(K*C));

Wherein:

$\rho$ is the reference density of the scene;

$\rho_i$ is the result density for mesh $M_i$;

K is the predicted density for the bounding box, which is occupied by this mesh; and C is a coefficient proportional to the total number of meshes in this scene.

I. E. Sample Data for a Sample Scene

Table I is a table of data describing the sample scene graph of FIG. 1. For example, if the total number of polygons in the scene is 27,390, and a user-specified scene reduction ratio (SPRR) is 10%, then after simplification the topology of the scene graph may be as shown in FIG. 3. Table I outlines key data for the sample scene.

TABLE I

| Mesh (n) | P ($M_i$) | LPRR (n) | Surface area | Density | Simplified P ($M_i$) |
|---|---|---|---|---|---|
| $M_0$ | 180 | 100% | 27776.25 | 0.0065 | MPRR = 100% (Only one level of detail for Mesh $M_0$) |
| $M_1$ | 11520 | 10% | 55670.09 | 0.2069 | $MPRR_{10}$ = 33% (The first level of detail for Mesh $M_1$) $MPRR_{11}$ = 10% (The second level of detail for Mesh $M_1$) |
| $M_2$ | 15690 | 7% | 54611.55 | 0.2872 | $MPRR_{20}$ = 28% (The first level of detail for Mesh $M_2$) $MPRR_{21}$ = 7% (The second level of detail for Mesh $M_2$) |

II. Using the LPPR to Generate Various Levels of Detail Variables for a Mesh

Block 62 describes generating levels of detail variables for each mesh. In one embodiment, the variables include a switch in distance and a mesh polygon reduction ratio (MPRR). Input parameters to this operation include: (1) the LPRR for mesh $M_i$ (this would be the least detailed polygon reduction ratio for the mesh); (2) the maximum distance (switch out), Rmax, within which the mesh $M_i$ would not be culled; (3) the minimum distance (switch in), Rmin, within which the most detailed version of mesh $M_i$ would be displayed; and (4) the total number of levels, N, which indicates the maximum number of levels of detail that the mesh $M_i$ may have. Output parameters from this operation include the set of switch in distances R (N)={Rmin, R1, R2 . . . Rmax}, and the set of mesh polygon reduction ratios (MPRRs) MPRR (N)={1, $MPRR_0$ . . . $MPRR_n$}; i.e., each level's polygon reduction ratio.

For example, if a LPRR=2% as determined in block 60, and Rmin=10, Rmax=320, and N=6, then the output variables produced may be, for example, R(N)={10, 20, 40, 80, 160, 320} and the corresponding MPRR (N)={1.0, 0.67, 0.32, 0.17, 0.05, 0.02}.

One of the goals of using LOD for meshes is to minimize the load on the computer system to improve the rendering performance for complex scenes. At the same time, graphics subsystems try to guarantee a minimum rendered image quality for each object within the scene. An embodiment of the present invention uses processing based on three equations to balance the computer load at runtime for rendering complicated hierarchical scenes. The first equation defined below may be used to describe the relationship of a switch branch, the resolution of the image, and the computer load. It balances these factors to get the best combination for optimal overall display performance.

An energy equation may be defined to represent the load of the computer at time t:

$$E_t(R, \varepsilon) = \sum_{i=1}^{n-1} (R_{i+1}^3 - R_i^3)\varepsilon_i \qquad (1).$$

Wherein:

$E_t$ is the energy used to measure the computer load;

R is the switch in distance; and $\varepsilon$ is the MPRR.

Based on an image-quality-oriented strategy, a known method uses image processing techniques to quantify the differences between the two representations in two dimensions. This method is disclosed in P. W. C. Maciel and P. Shirley, "Visual Navigation of Large Environments Using Textured Clusters," in Computer Graphics (Symposium '95 on Interactive 3D Graphics), pages 95–102, June 1995. In one embodiment, this strategy may be extended to three dimensions in the following equations:

$$\varepsilon_i/\varepsilon_j - 1 = R_{i-1}^2/R_i^2 \qquad (2).$$

$$\varepsilon_i = K_{co}/R_i^2 \qquad (3).$$

Let $X_i = R_{i+1}/R_i$.

Let $K = R_n/R_1$.

By minimizing the energy equation $E_t(R, \varepsilon)$, the following result may be determined:

$$(X_1)^c = K/(2/3)^{n-c}$$

$$c = 3 - 2*(2/3)^{n-1}$$

$$Xi = (3/2)^{(1-(2/3)^{i-1})} * X_1^{(2/3)^{i-1}}$$

In fact, it may be proved that Xi will converge to A (a coefficient approximating K, the predicted polygon density), when n is large enough.

III. Polygonal Surface Simplification

Once the combined distance, resolution and performance issues have been resolved, a simplified version of each object in the scene may be produced. In contrast to prior art simplification methods, an embodiment of the present invention uses a local optimization to simplify polygonal surfaces. This feature gives better performance than existing simplification methods. Block 64 of FIG. 4 describes generating a simplified version of a mesh by using the mesh polygon reduction ratio (MPRR) as calculated in block 62. Input parameters to this operation include a MPRR represented by $\varepsilon$, and a mesh $M_i$. Output parameters of this operation include $M_{i1}$, which is a simplified version of $M_i$, such that $P(M_{i1}) = P(M_i) * \varepsilon$.

For example, when $\varepsilon = 2\%$, $P(M_2) = 18,000$. The generated $P(M_{21}) = 18,000 * 2\% = 360$.

According to an embodiment of the present invention, a triangular surface simplification method may be described as follows. It may be based on edge contraction, but it only supports manifold models. In terms of efficiency, the method may be used to simplify complex models quite rapidly. For example, it can create a 900 faces approximation of a 18,000 faces model in approximately 15 seconds on a personal computer system having dual Pentium®II Xeon processors (commercially available from Intel Corporation) operating at 400 MHZ, with a 1M internal cache, and 128 MB of memory. The method provides high quality approximations. The approximations produced by this technique maintain high fidelity to the original model. The sharp and primary features of the model, including the scalar attributes of texture coordinates/vertex color are preserved. In addition, the technique permits changes to the topology of discrete attributes, for example, the Material ID (texture).

The technique may support terrain-like models (e.g., height fields), by adding an additional perpendicular plane running through a contracted edge, which in one embodiment may be weighted by a large penalty factor and subsequently added to the energy equation. The technique maintains a heap (a spatial partitioning data structure) which stores all valid edge contraction pairs indexed by their respective ØE values. In addition, the technique uses a local optimization; each edge contraction action corresponds only to a local incremental modification of the current model. In fact, the technique generates a sequence of models $M_n$, $M_{n-1}, \ldots M_i$. Thus, a single pass may be used to produce a large number of approximate models or a multiresolution representation such as a progressive mesh (as discussed in Hugues Hoppe, "Progressive Meshes", SIGGRAPH'96 Proceedings, pages 99–108, August 1996.).

The triangular surface simplification method of embodiments of the present invention is as follows:

Let NeighborFace(v, $M_i$) be the triangular faces in Mesh $M_i$ that meet at vertex v.

NeighborFace(v) = {triangle$_i$|v∈triangle$_i$, triangle$_i$∈$M_i$}

Let NeighborVertex(v, $M_i$) be the vertices each of which is included in the triangle that meets at vertex v in mesh $M_i$.

NeighborVertex(v, $M_i$) = {$v_i$|$v_i$∈NeighborFace(v, $M_i$)}

Edge contraction may be defined as: $(v_1, v_2) \to v$

Let a plane be the plane equation of triangle: plane = [Nx, Ny, Nz, d]$^T$

Let v = [vx, vy, vz, 1]$^T$

Let the original mesh be $M_i$, and the simplified version be $M_{i1}$.

An energy equation may be defined:

$$\emptyset E = \sum_{i=1}^{n} d^2(v, plane_i). \qquad (4).$$

Where (Plane$_i$∈NeighborFace($v_i$, $M_i$)∪NeighborFace($v_j$, $M_i$)).

To speed up the process of tracking the original mesh $M_i$: NeighborFace($v_i$, $M_i$)∪NeighborFace($v_j$, $M_i$), an extra list may be added to vertex $v_i$ to record the Neighbor history. The initial set is NeighborFace($v_i$, $M_i$).

For each contraction $(v_i, v_2) \to v$, we update this Neighbor history:

NeighborFace(v, $M_i$) = NeighborFace($v_1$, $M_i$)∪NeighborFace($v_2$, $M_i$).

An eigenmatrix for vertex v may be defined:

$$matrix_i = \sum_{i=1}^{n} (plane_i^T \cdot plane_i) \qquad (5).$$

Where (Plane$_i$∈NeighborFace(v, $M_i$).

By using equations (4) & (5), the value ØE may be redefined as:

$$\emptyset E = v_i^T \cdot matrix_i \cdot v_i \qquad (6).$$

The minimum ØE may not exist. In such cases, the line ($v_1$, $v_2$) must be one of the solutions to this minimum problem. Accordingly, $$V = v_1 + t(v_2 - v_1), t \in [0,1]; \qquad (7).$$

Using equations (6) & (7), the best v may be determined.

The triangular surface simplification technique of embodiments of the present invention is represented in pseudo-code in Table II.

TABLE II

Procedure Simplify ($M_i$, $\epsilon$)
Begin
  Check whether this mesh is manifold or not, if not, try to fix it, or exit.
  $PM_i = P(M_i) * \epsilon$.
  Initiate Neighbor history list for each vertex in the mesh.
  Create edge contractions for each vertex.
  Compute the optimal contraction edge.
  Place all the created contraction edges in a heap keyed by the respective ØE.
  while($P(M_i) > P\ M_i$) loop
    Iteratively remove the edge contraction ($v_1$, $v_2$) →v of the least ØE from the heap, contract this edge, and update the ØE of all edge contractions in heap.
  End loop
End procedure In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 7:
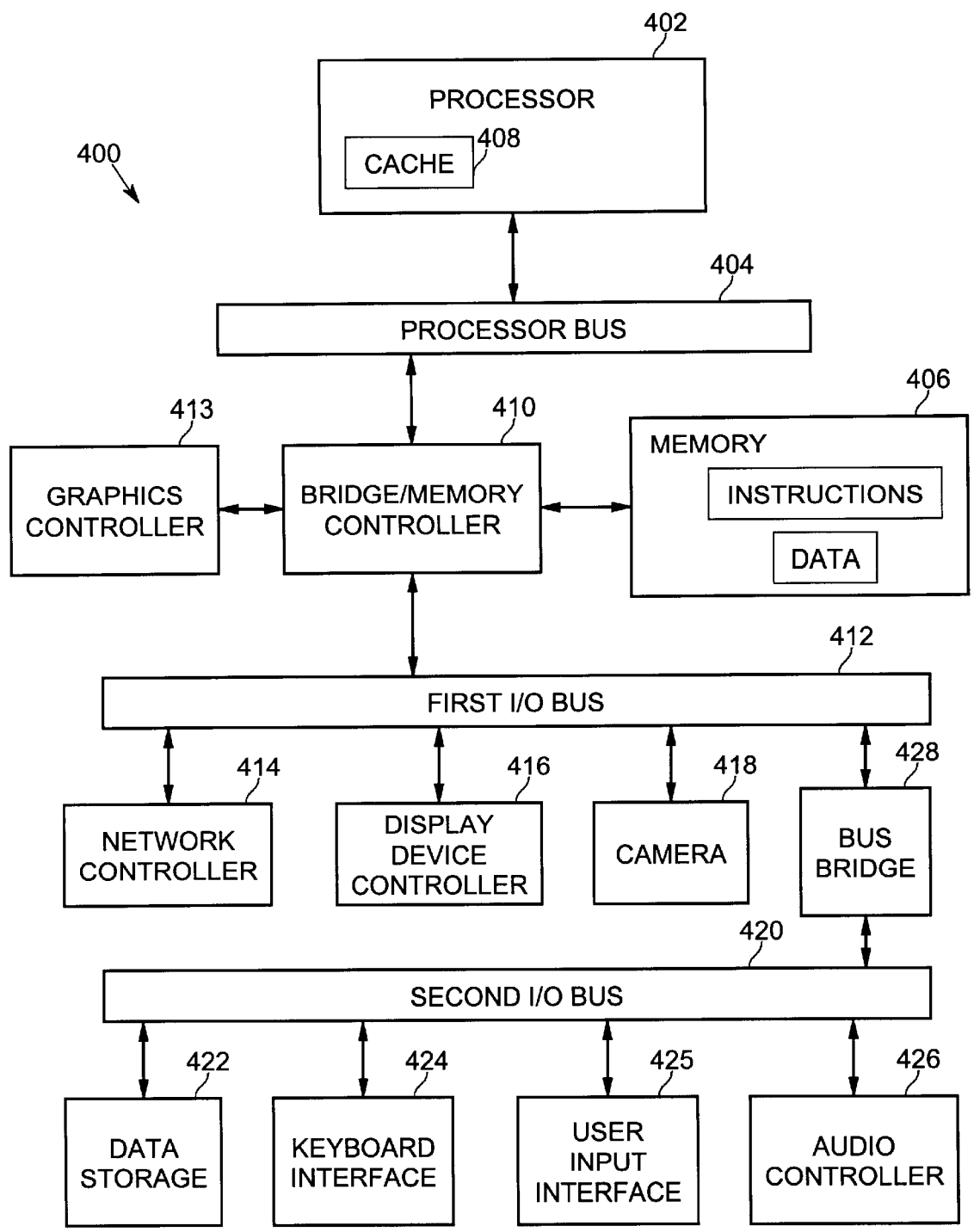
FIG. 7 is a diagram illustrating a sample system capable of being operated according to an embodiment of a method of hierarchical static scene simplification in accordance with the present invention.

An example of one such type of processing system is shown in FIG. 7. Sample system 400 may be used, for example, to execute the processing for embodiments of a method for hierarchical static scene simplification, in accordance with the present invention, such as the embodiment described herein. Sample system 400 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 7 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 7 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 7) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus to capture live events. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to provide hierarchical static scene simplification. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to provide hierarchical static scene simplification according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of providing hierarchical static scene simplification in accordance with the present invention, whereas memory 406 is used to store on a shorter term basis the executable instructions of embodiments of the methods for providing hierarchical static scene simplification in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of scene simplification comprising:

concurrently simplifying a plurality of polygonal meshes in a scene represented by a hierarchical scene graph, the hierarchical scene graph comprising a plurality of nodes, each node storing a mesh; by determining an initial least level of detail polygon reduction ratio (LPPR) for at least one mesh;

generating levels of detail variables for at least one mesh using the LPRR;

generating a simplified version of at least one mesh by using the levels of detail variables; and rendering the simplified scene on a display;

wherein determining the LPRR comprises:

computing the surface area and polygon density for a mesh;

determining a predicted polygon density for the mesh within a three dimensional bounding box;

obtaining a reference density; and generating the LPRR for the mesh as a function of the three dimensional bounding box, the reference density, and the predicted polygon density of the mesh.

2. The method of claim 1, wherein the scene comprises a three dimensional scene and the polygonal meshes comprise representations of three dimensional objects.

3. The method of claim 1, further comprising determining a LPRR, generating levels of detail variables, and generating a simplified version, for all meshes in the hierarchical scene graph.

4. The method of claim 1, wherein the simplified mesh comprises the same topological type as the mesh's original geometric representation, but with a smaller number of vertices.

5. The method of claim 1, wherein determining the LPRR comprises using a scene polygon reduction ratio to determine, at least in part, the LPRR.

6. The method of claim 1, wherein the levels of detail variables comprise at least a switch in distance and a mesh polygon reduction ratio.

7. The method of claim 1, wherein the data structure comprises an octree.

8. An article comprising: a machine readable medium having a plurality of machine readable instructions, wherein when the instructions are executed by a processor, the instructions implement concurrent simplification of a plurality of polygonal meshes in a scene represented by a hierarchical scene graph, the hierarchical scene graph comprising a plurality of nodes, each node storing a mesh; by determining an initial least level of detail polygon reduction ratio (LPPR) for at least one mesh;

generating levels of detail variables for at least one mesh using the LPRR;

generating a simplified version of at least one mesh by using the levels of detail variables; and rendering the simplified scene on a display;

wherein determining the LPRR comprises:

computing the surface area and polygon density for a mesh;

determining a predicted polygon density for the mesh within a three dimensional bounding box;

obtaining a reference density; and generating the LPRR for the mesh as a function of the three dimensional bounding box, the reference density, and the predicted polygon density of the mesh.

9. The article of claim 8, wherein the scene comprises a three dimensional scene and the polygonal meshes comprise representations of three dimensional objects.

10. The article of claim 8, wherein the simplified mesh comprises the same topological type the mesh's original geometric representation, but with a smaller number of vertices.

11. The article of claim 8, wherein instructions to determine the LPRR comprise instructions for using a scene polygon reduction ratio to determine, at least in part, the LPRR.

12. The article of claim 8, wherein the levels of detail variables comprise at least a switch in distance and a mesh polygon reduction ratio.

13. A method of simplifying a scene represented by a hierarchical scene graph having polygonal meshes as nodes comprising:

for each mesh in the hierarchical scene graph, determining each mesh's initial least level of detail polygon reduction ratio (LPRR);

for each mesh, generating levels of detail variables using the mesh's LPRR, the levels of detail variables including a switch in distance and a mesh polygon reduction ratio (MPRR);

for each mesh, generating a simplified version of the mesh using the levels of detail variables; and rendering the simplified scene on a display;

wherein determining LPRRs comprises:

computing the surface area and polygon density for each mesh;

building a data structure to partition the space of the scene;

inserting each mesh's surface area and density into the data structure;

analyzing the data structure to obtain a predicted polygon density for each mesh within a three dimensional bounding box;

sorting the meshes according to each mesh's predicted polygon density;

using a convolution method to obtain a reference density; and determining a LPRR for each mesh as a function of the mesh's three dimensional bounding box, the reference density and the mesh's predicted polygon density.

14. An article comprising: a machine readable medium having a plurality of machine readable instructions, wherein when the instructions are executed by a processor, the instructions simplify a scene represented by a hierarchical scene graph having polygonal meshes as nodes by determining, for each mesh in the hierarchical scene graph, each mesh's initial least level of detail polygon reduction ratio (LPRR), generating, for each mesh, levels of detail variables using the mesh's LPRR, the levels of detail variables including a switch in distance and a mesh polygon reduction ratio (MPRR), generating, for each mesh, a simplified version of the mesh using the levels of detail variables; and rendering the simplified scene on a display; wherein instructions to determine the LPRRs comprise instructions to:

compute the surface area and polygon density for each mesh;

build a data structure to partition the space of the scene;

insert each mesh's surface area and density into the data structure;

analyze the data structure to obtain a predicted polygon density for each mesh within a three dimensional bounding box;

sort the meshes according to each mesh's predicted polygon density;

use a convolution method to obtain a reference density; and determine a LPRR for each mesh as a function of the mesh's three dimensional bounding box, the reference density and the mesh's predicted polygon density.

\* \* \* \* \*

UNITED STATES PATENT AND TRADEMARK OFFICE
CERTIFICATE OF CORRECTION

PATENT NO.    : 6,307,558 B1
DATED         : October 23, 2001
INVENTOR(S)   : Mao It is certified that error appears in the above-identified patent and that said Letters Patent is hereby corrected as shown below:

Column 8,
Line 55, delete "$v_i, v_2$", insert -- $v_1, v_2$ --.

Column 9,
Line 24, delete "$P(M_i)$", insert -- $P(M_{i1})$ --.

Signed and Sealed this

Tenth Day of September, 2002

Attest:

JAMES E. ROGAN
Attesting Officer    Director of the United States Patent and Trademark Office